United States Patent
Fukutomi et al.

(10) Patent No.: US 9,873,458 B2
(45) Date of Patent: Jan. 23, 2018

(54) VEHICLE REAR STRUCTURE

(71) Applicant: HONDA MOTOR CO., LTD, Tokyo (JP)

(72) Inventors: Tsutomu Fukutomi, Wako (JP); Gen Yoshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/166,850

(22) Filed: May 27, 2016

(65) Prior Publication Data

US 2016/0347141 A1 Dec. 1, 2016

(30) Foreign Application Priority Data

Jun. 1, 2015 (JP) .................. 2015-111094

(51) Int. Cl.
*B62D 25/08* (2006.01)

(52) U.S. Cl.
CPC .......... *B62D 25/088* (2013.01); *B62D 25/087* (2013.01)

(58) Field of Classification Search
CPC ..... B62D 25/088; B62D 25/08; B62D 25/087
USPC ................................. 280/124.157
See application file for complete search history.

(56) References Cited

U.S. PATENT DOCUMENTS

| 6,293,572 | B1* | 9/2001 | Robbins | B60G 15/063 267/220 |
|---|---|---|---|---|
| 9,616,937 | B2* | 4/2017 | Sasaki | B62D 25/088 |
| 2006/0119140 | A1* | 6/2006 | Yamazaki | B62D 25/08 296/203.04 |
| 2016/0185394 | A1* | 6/2016 | Sasaki | B62D 29/00 296/191 |

FOREIGN PATENT DOCUMENTS

| JP | 3214342 B2 | 10/2001 |
|---|---|---|
| JP | 4376277 B2 | 12/2009 |

OTHER PUBLICATIONS

JP2009001197 a translation of a reference cited on the 1449 filed May 27, 2016 is attached.*

* cited by examiner

*Primary Examiner* — Faye M Fleming
(74) *Attorney, Agent, or Firm* — Westerman, Hattori, Daniels & Adrian, LLP

(57) ABSTRACT

A vehicle rear structure includes rear wheel houses that are provided on right and left sides of a vehicle and have shook absorber housings for housing shook absorbers and a rear bulkhead. The shock absorber housings have bag structures having closed spaces therein formed in upper portions thereof. The bag structures have the shock absorbers secured thereto and secured to the bulkhead.

19 Claims, 11 Drawing Sheets

FIG. 5
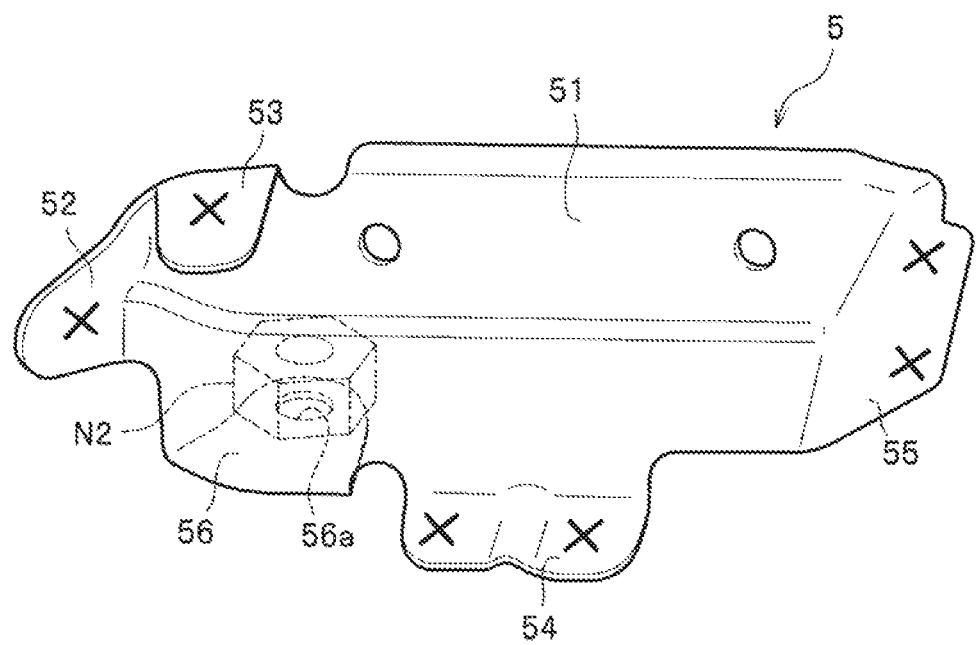
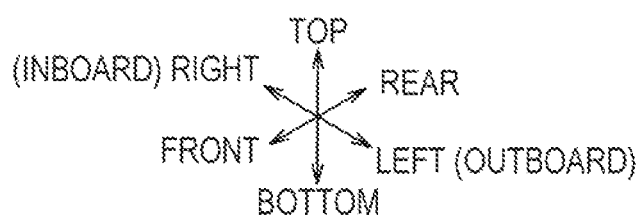

FIG. 7
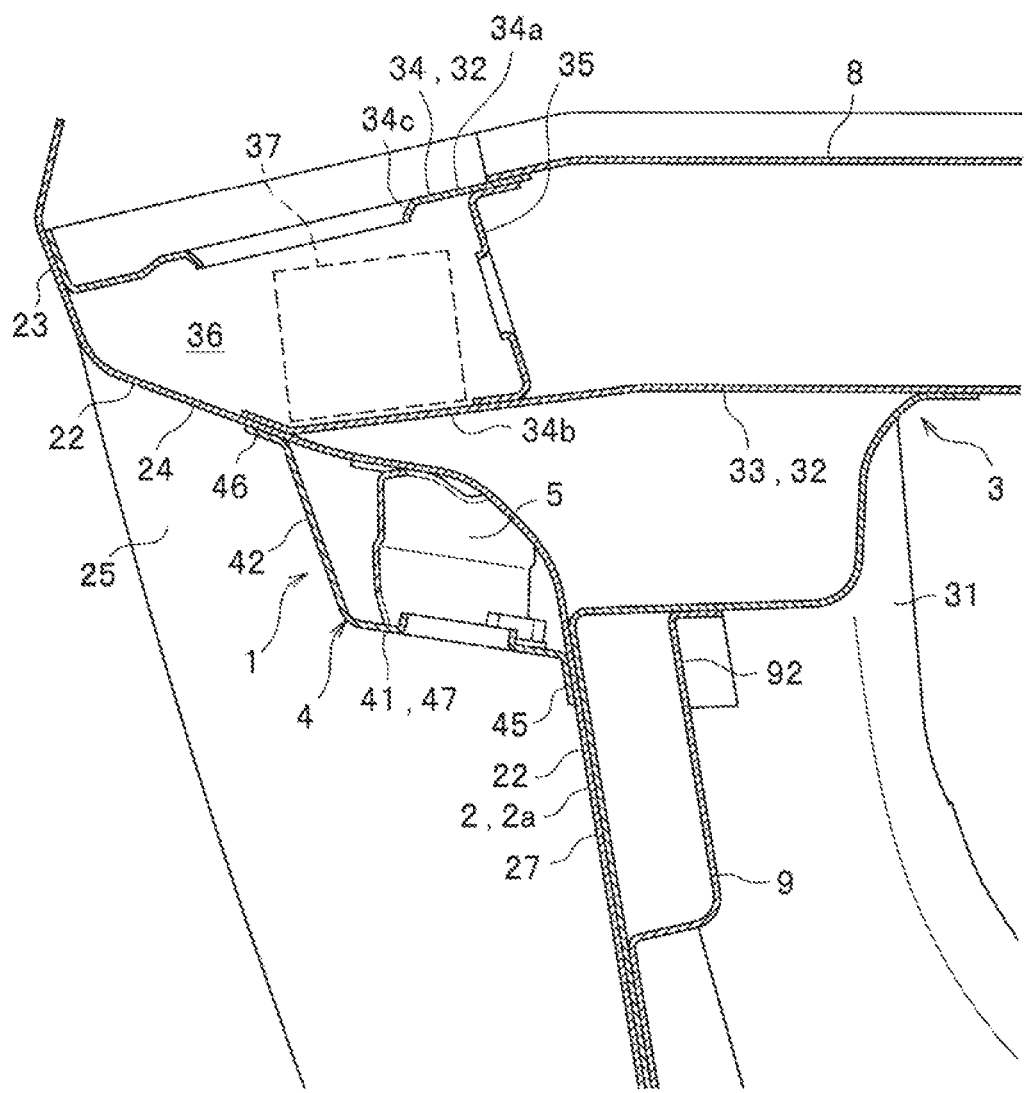
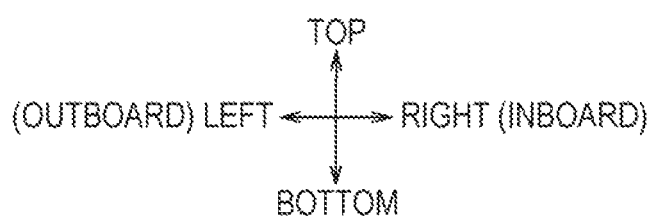

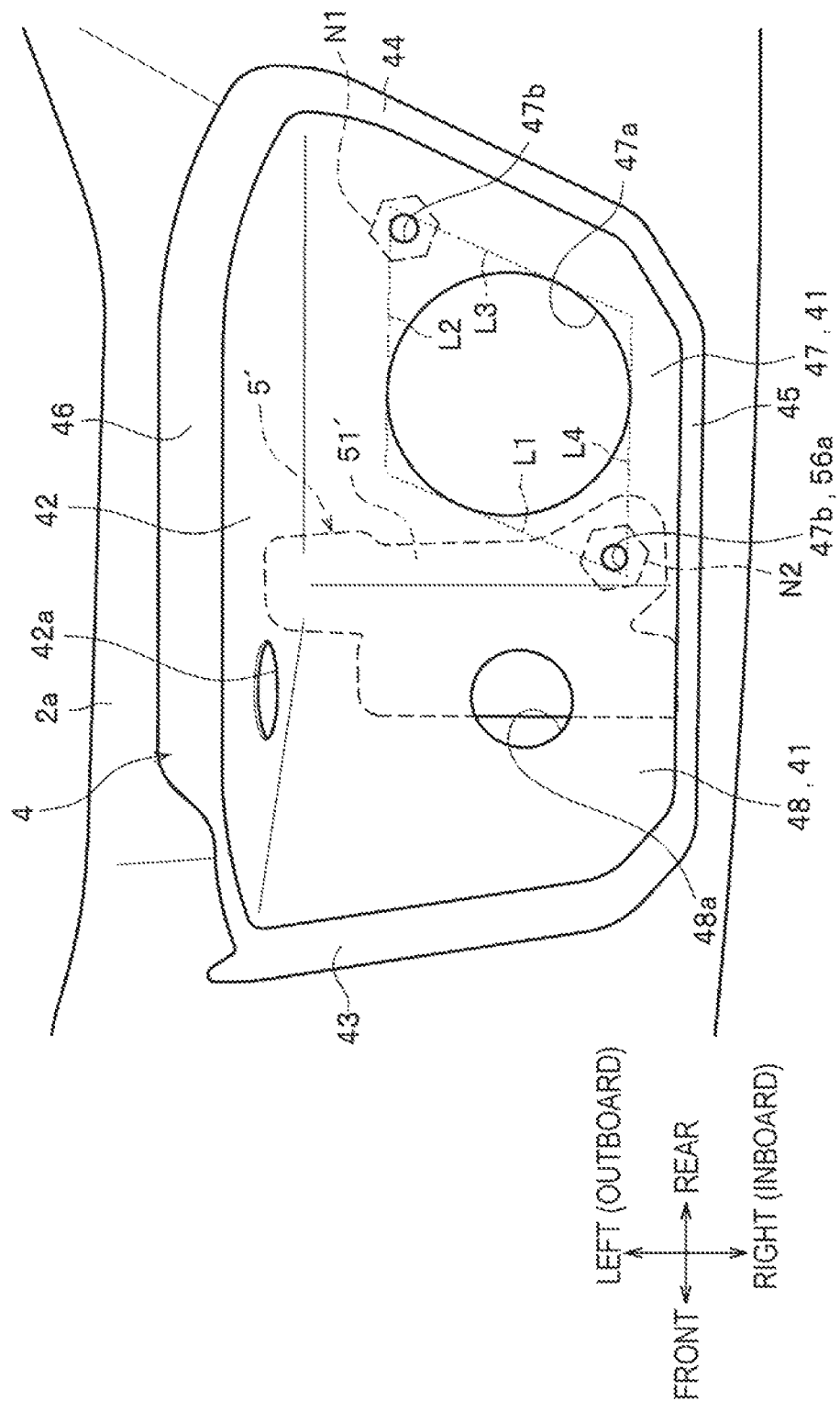

VEHICLE REAR STRUCTURE

CROSS-REFERENCE TO RELATED APPLICATIONS

The present application claims priority under 35 U.S.C. §119 to Japanese Patent Application 2015-111094, filed Jun. 1, 2015, entitled "Vehicle Rear Structure." The contents of this application are incorporated herein by reference in their entirety.

TECHNICAL FIELD

The present disclosure relates to a vehicle rear structure.

BACKGROUND

When a vehicle is running, a shook absorber mounting surface of the vehicle may be deformed due to a load coming from a tire via a shock absorber, which may adversely affect maneuvering stability of the vehicle. To solve such an adverse effect, a technique for eliminating or reducing deformation of the shock absorber mounting surface has been developed.

Japanese Patent No. 3214342, for example, discloses a vehicle rear structure in which a shock absorber mounting bracket (shock absorber mounting surface) is joined to an upper end of a rear strut tower formed at an upper portion of a rear wheel house and such a shock absorber mounting bracket is joined to a lower wall of a rear parcel member.

In addition, Japanese patent No. 4376277 discloses a vehicle rear structure in which a box-shaped reinforcement section is provided on a shock absorber mounting surface formed at an upper portion of a rear wheel house.

In the vehicle rear structure disclosed in Japanese Patent No. 3214342, the shock absorber mounting bracket and the lower wall of the rear parcel member are joined to each other whereby the rear parcel member bears a load as well. However, the shock absorber mounting bracket, if low in stiffness, may be easily deformed, making it difficult to transmit a load to the rear parcel member. To overcome such difficulty, the stiffness must be improved by increasing plate thickness of the shock absorber mounting bracket, but increased plate thickness will result in an increase in weight.

The reinforcement, section disclosed in Japanese patent No. 4376277 consists of a bottom joined to the shock absorber mounting surface and four side walls extending upward from circumferential edges of the bottom and has an opening formed at an upper portion thereof. Accordingly, the reinforcement section disclosed in Japanese patent No. 4376277 suffers from deterioration in stiffness due to the presence of the opening, which may be unlikely to sufficiently prevent or reduce deformation of the shock absorber mounting surface.

SUMMARY

The present application describes a vehicle rear structure that can, for example, prevent or reduce deformation of a shock absorber mounting surface while contributing to a reduction in vehicle weight and an improvement to maneuvering stability.

A first aspect of the present application provides a vehicle rear structure which includes rear wheel houses that are provided on right and left sides of a vehicle and that have shock absorber housings for housing shock absorbers and a partitioning member that is provided between the right and left rear wheel houses and separates between a passenger compartment and a luggage compartment, in which the shock absorber housings have bag structures having closed spaces therein formed in upper portions thereof and in which the bag structures have the shock absorbers secured thereto and are secured to the partitioning member.

The bag structures having closed spaces therein are rigid bodies whereby the shock absorber mounting surfaces to which the shock absorbers are secured can be improved in rigidity. In addition, the bag structures having rigid bodies and the rear bulkhead are joined to each other whereby a load coining from the shock absorbers can be reliably transmitted to the rear bulkhead. With this arrangement, a deformation of the shook absorber mounting surfaces can be reduced or eliminated whereby plate thickness of the shock absorber mounting surfaces can be reduced for reduction in weight and the characteristics of the shock absorbers can be exhibited to the full extent for improvement in maneuvering stability.

A second aspect of the present application provides a vehicle rear structure which preferably further includes bulkheads disposed in the bag structures. The bulkheads can improve the bag structures in rigidity.

A third aspect of the present application provides a vehicle rear structure in which the bag structures preferably have first shock absorber fastening portions for securing the shock absorbers and in which the bulkheads are preferably disposed at positions corresponding to the first shock absorber fastening portions or in the vicinity of the first shock absorber fastening portions. With this arrangement, the first shock absorber fastening portions can be improved in rigidity, which reduces or eliminates deformation of the shock absorber mounting surfaces.

A fourth aspect of the present application provides a vehicle rear structure in which the bulkheads preferably have second shock absorber fastening portions for securing the shock absorbers. With this arrangement, deformation of the shock absorber mounting surfaces can be further reduced or eliminated due to the enhanced rigidity of the second shock absorber fastening portions.

A fifth aspect of the present application provides a vehicle rear structure in which the bag structures preferably have mounting holes through which heads of the shock absorbers are inserted and the first shock absorber fastening portions are preferably formed around the mounting holes. In this case, the bulkheads are preferably disposed so as to be aligned with virtual lines that are tangential to the mounting holes and the first shook absorber fastening portions. With this arrangement, deformation of the shock absorber mounting surfaces can be further reduced or eliminated due to enhanced rigidity of the mounting holes and the first shock absorber fastening portions.

A sixth aspect of the present application provides a vehicle rear structure which preferably further includes shock absorber bases that are disposed in the shock absorber housings and that have shock absorbers secured thereto, in which the bag structures are formed by the shock absorber housings and the shock absorber bases. In this case, preferably, the shock absorber bases have front flanges formed at front ends thereof and have rear flanges formed at rear ends thereof, and the front flanges or the rear flanges or both of the front flanges and the rear flanges are preferably secured to the partitioning member via the shook absorber housings. With this arrangement, a load can be reliably transmitted from the front flanges or the rear flanges or both of the front flanges and the rear flanges of the shock absorber bases to the partitioning member via the shock absorber housing.

A seventh aspect of the present application provides a vehicle rear structure in which the shock absorber bases preferably have shock absorber mounting surfaces to which the shock absorbers are secured and slanted surfaces that extend continuously to the shock absorber mounting surfaces and that are slanted in such a manner that portions thereof farther away from the shock absorber mounting surfaces are located closer to the top of the vehicle. With this arrangement, an out-of-plane deformation (or vertical deformation) can be reduced or eliminated due to the presence of the slanted surfaces and the bag structures can be improved in rigidity.

An eighth aspect of the present application provides a vehicle rear structure in which the partitioning member preferably has horizontal members extending in the vehicle-width direction and outboard ends of the horizontal members extend to above the bag structures and in which the shock absorber bases preferably have outboard flanges formed at upper ends thereof. In this case, the outboard flanges are preferably secured to outboard ends of the horizontal members via the shock absorber housings. With this arrangement, a load can be reliably transmitted from the outboard flanges of the shock absorber bases to the horizontal members of the partitioning member via the shock absorber housings.

A ninth aspect of the present application provides a vehicle rear structure in which the horizontal members preferably have horizontal member bulkheads formed therein and the horizontal member bulkheads are disposed above the bag structures. With this arrangement, a load can be reliably transmitted from the bag structures to the horizontal members of the partitioning member via the shock absorber housings.

A tenth aspect of the present application provides a vehicle rear structure which preferably further includes reinforcing braces provided on the inboard sides of the rear wheel houses, in which the partitioning member preferably has vertical members provided on the inboard sides of the rear wheel houses. In this case, the reinforcing braces and the vertical members are preferably disposed in the shape of an inverted V as seen in side view. In addition, the shock absorber bases preferably have inboard flanges that are formed at inboard ends thereof and are secured to the rear wheel houses. In this case, the reinforcing braces are preferably secured to the rear wheel houses and the vertical members in the vicinity of the inboard flanges with this arrangement, a load can foe reliably transmitted from the inboard flanges to the vertical members of the partitioning member via the reinforcing braces.

An eleventh aspect of the present application provides a vehicle rear structure which preferably includes rear side frames that are provided on right and left sides of a vehicle and that extend in the vehicle-width direction, the partitioning member having an annular skeleton that is provided between the right and left rear side frames and that is mounted obliquely in such a manner that a portion thereof closer to the top of the vehicle is located closer to the rear, reinforcing braces that are provided between the rear side frames and the partitioning member and that are mounted obliquely in such a manner that portions thereof closer to the top above the rear side frames are located closer to the front, and a rear cross member that extends in the vehicle-width direction between the right and left rear side frames and that is joined to the rear side frames at right and left ends thereof corresponding to lower ends of the reinforcing braces. With this arrangement, the right and left rear side frames, the partitioning member, the right and left reinforcing braces, and the rear cross member are assembled so as to form a triangular prismatic skeleton structure. In this case, the bag structures are preferably provided at right and left upper apexes of the skeleton structure, respectively. Due to the bag structures reinforcing the triangular prismatic skeleton structure, the rear section of the vehicle can be significantly improved in rigidity and a load coining from the rear sub-frame disposed below the rear side frames can be supported by the triangular prismatic skeleton structure, thereby improving maneuvering stability. In addition, a load coming from the shock absorbers can also be supported by the triangular prismatic skeleton structure in a preferred manner.

A twelfth aspect of the present application provides a vehicle rear structure in which, in the partitioning member, housings for housing seat belt take-up devices are preferably provided above the bag structures. With this arrangement, the seat belt take-up devices can be housed in the partitioning member, thereby creating a space for disposing a rear quarter glass, which improves rear visibility.

The vehicle rear structure according to the present application can, for example, prevent or reduce deformation of a shock absorber mounting surface while contributing to a reduction in vehicle weight and an improvement to maneuvering stability.

BRIEF DESCRIPTION OF THE DRAWINGS

FIG. 5 is a perspective view of a bulkhead according to an embodiment.

FIG. 7 is a cross-sectional view taken along line VII-VII of FIG. 6.

FIG. 11 is a bottom view, as seen from below, of a shock absorber base and a bulkhead according to a modification.

DETAILED DESCRIPTION

An embodiment of the present application will be described below with reference to the attached drawings. In this description, the same symbols refer to the same components, and repeated descriptions of the same components are omitted. In addition, references to "front" and "rear" indicated by arrows in the attached drawings represent the longitudinal direction of a vehicle, while references to "top" and "bottom" represent the vertical direction of the vehicle. Furthermore, references to "right" and "left" represent the horizontal (vehicle-width) direction as seen from the driver's seat of the vehicle.

Figure 1:
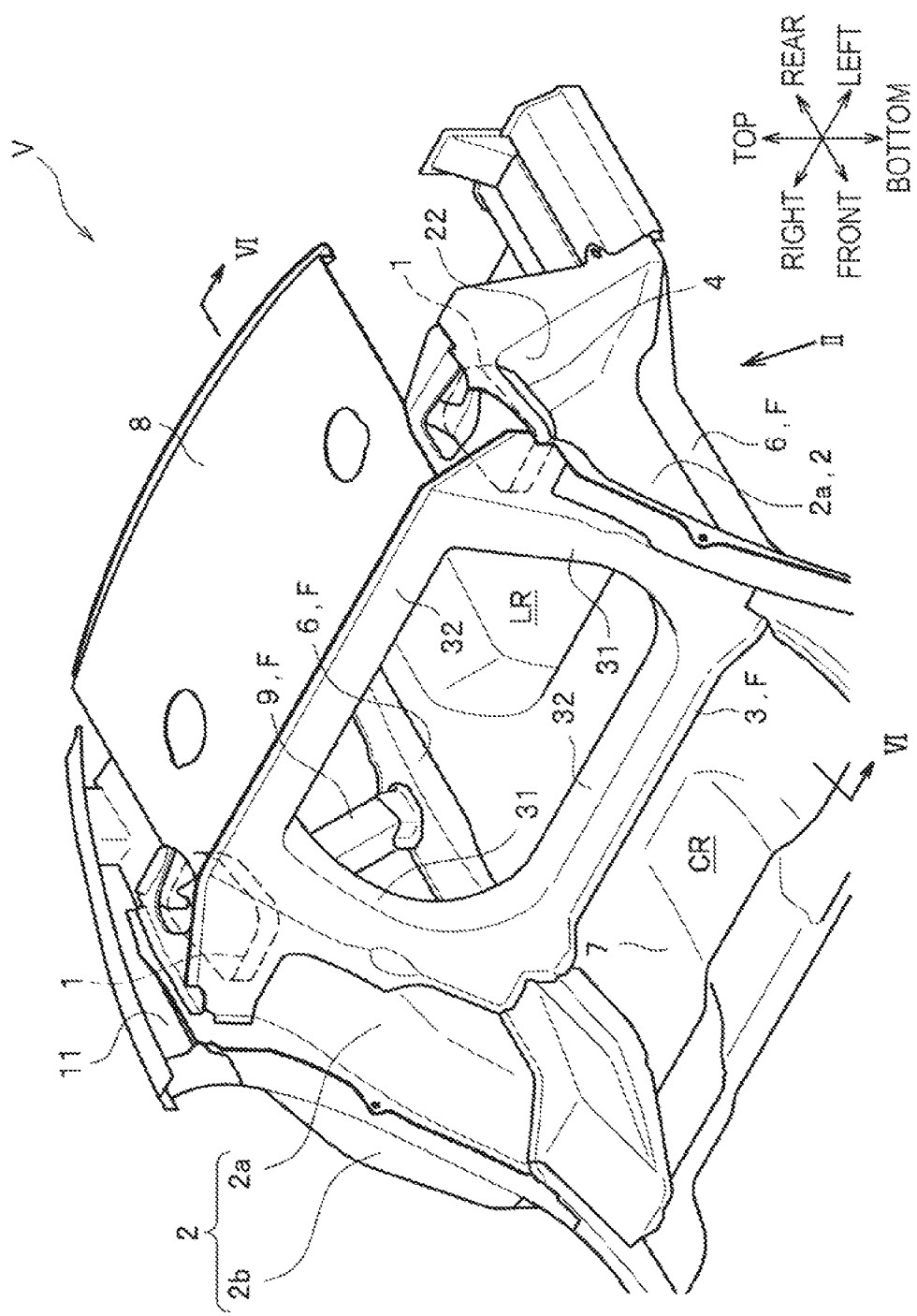
FIG. 1 is a schematic perspective view as seen from a front left of a vehicle that uses a vehicle rear structure according to an embodiment of the present application.

As shown in FIG. 1, a vehicle V that uses a vehicle rear structure according to an embodiment of the present application is provided with a pair of right and left rear side frames 6, 6, a rear floor panel 7, a pair of right and left rear wheel houses 2, 2, a rear bulkhead 3, a parcel shelf 8, a pair of right and left reinforcing braces 9, 9 (only the right side shown in FIG. 1), a rear cross member 10 (see FIG. 2), and a pair of right and left bag structures 1, 1. In addition, the vehicle V is provided with a passenger compartment CR that is the area of the vehicle V designed for the seating of occupants and a luggage compartment LR that is the area of the vehicle V designed for carrying luggage.

[Rear Side Frames]

The rear side frames 6, 6 are metal members having hollow sections that extend in the longitudinal direction of the vehicle V. The rear side frames 6 are provided on right and left sides of the vehicle V, respectively. The rear side frames 6, 6 form part of a skeleton structure F provided in the rear of the vehicle V. The skeleton structure F will be described in detail later in this description.

[Rear Floor Panel]

The rear floor panel 7 is a metal member that forms a rear floor surface of the vehicle V. The rear floor panel 7 is provided between the right and left rear side frames 6, 6. The rear floor panel 7 is secured at a left end thereof to the left rear side frame 6 and is secured at a right end thereof to the right rear side frame 6.

[Rear Wheel Houses]

The rear wheel houses 2, 2 are metal members that are provided on the right and left sides of the vehicle V and extend upward from the outboard sides of the rear side frames 6, 6. Each of the rear wheel houses 2, 2 consists of a rear wheel house inner 2a that is located on the inboard side of the vehicle V and a rear wheel house outer 2b that is located on the outboard side of the vehicle V. FIG. 1 shows only the right rear wheel house outer 2b.

A rear quarter glass 11 is mounted on the outboard side of an upper end of the rear wheel house inner 2a. The left rear wheel house inner 2a is secured at a lower end thereof to the left rear side frame 6, while the right rear wheel house inner 2a is secured at a lower end thereof to the right rear side frame 6. The rear wheel house inner 2a will be described in detail later in this description.

[Rear Bulkhead]

The rear bulkhead 3 is a metal partitioning member that separates the passenger compartment CR and the luggage compartment LR. The rear bulkhead 3 is provided on the rear floor panel 7 and the rear side frames 6 so as to be located between the right and left rear wheel houses 2, 2. The rear bulkhead 3 according to this embodiment consists of a rectangular annular skeleton as seen from the front. In other words, the rear bulkhead 3 is provided with a trunk-through portion (or an opening) through which the passenger compartment CR and the luggage compartment Lr are in communication with each other. The rear bulkhead 3 forms part of the skeleton structure F located at the rear of the vehicle V. The rear bulkhead 3 may be formed in a rectangular shape as seen from the front without the trunk-through portion.

The rear bulkhead 3 consists of a pair of right and left vertical members 31, 31 extending obliquely upward from the rear side frames 6, 6 toward the parcel shelf 8 and a pair or upper and lower horizontal members 31, 32 extending in the vehicle-width direction between the right and left vertical members 31, 31. The rear bulkhead 3 will be described in detail later in this description.

[Parcel Shelf]

The parcel shelf 8 is a plate-like metal member extending in the vehicle-width direction. The parcel shelf 8 is mounted on the upper horizontal member 32. In addition, the parcel shelf 3 is secured at a front end thereof to the upper horizontal member 32.

[Reinforcing Braces]

The reinforcing braces 9, 9 are metal members that are provided on right and left sides of the vehicle V so as to extend upward from the rear side frames 6, 6. The reinforcing braces 9, 9 form part of the skeleton structure F located at the rear of the vehicle V. The reinforcing braces 9, 9 will be described in detail later in this description.

[Rear Cross Member]

Figure 2:
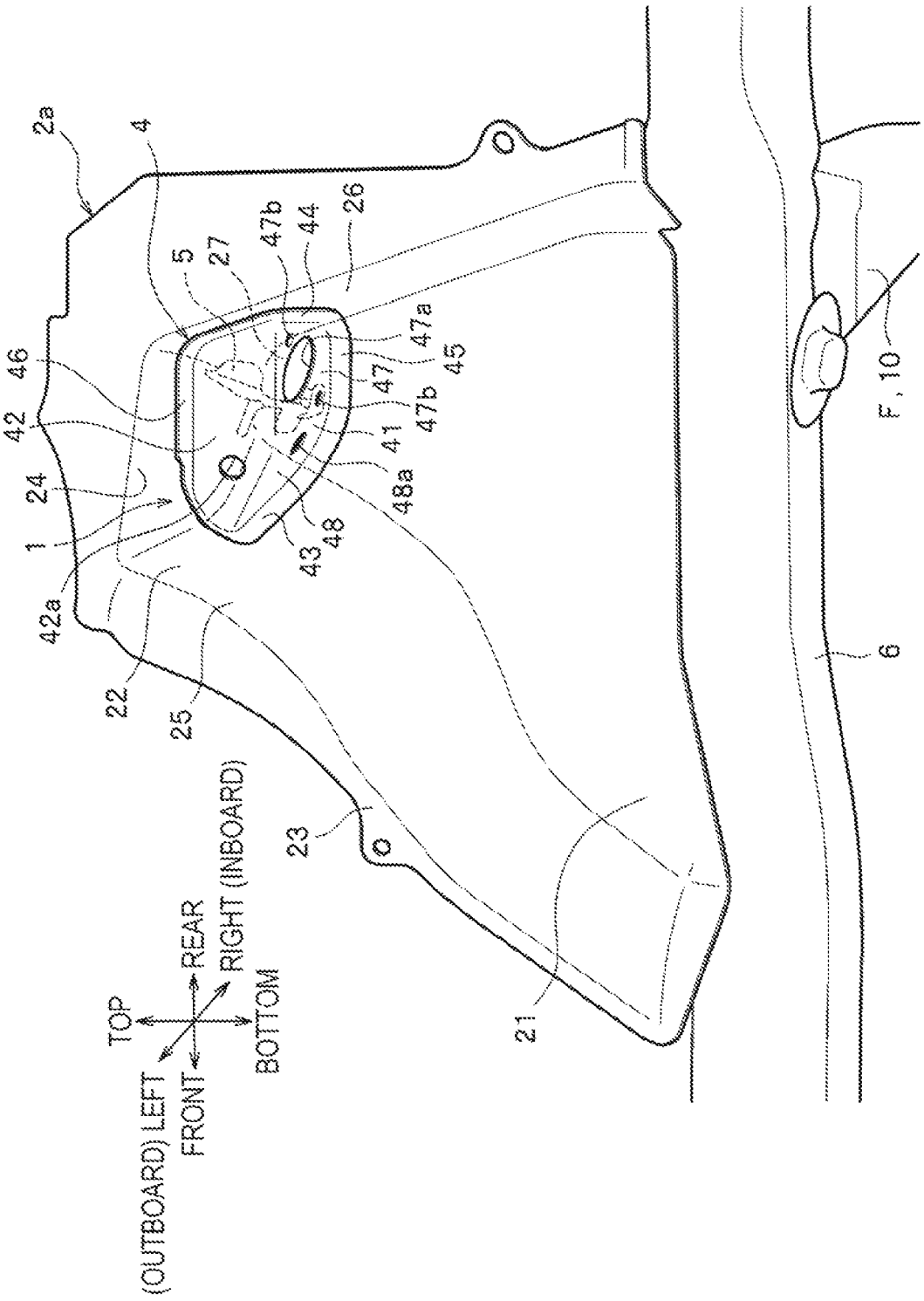
FIG. 2 is a perspective view as seen from an arrow II of FIG. 1.

The rear cross member 10 shown in FIG. 2 is a metal member extending in the vehicle-width direction. Though not illustrated in the figure, the rear cross member 10 is mounted between the right and left rear side frames 6, 6. The rear cross member 10 forms part of the skeleton structure F located at the rear of the vehicle V.

[Bag Structures]

The bag structures 1, 1 are provided on the right and left sides of the vehicle V and form closed spaces at the rear of the vehicle V. Each of the bag structures 1, 1 shown in FIG. 2 is a hexahedron formed by the rear wheel house inner 2a and a shock absorber base 4. The bag structure 1 is not limited to a hexahedron and may be a polyhedron consisting of five or more planes. The bag structure 1 has a bulkhead 5 disposed thereinside.

With reference to FIGS. 2 thorough 5, the rear wheel house inner 2a, the shock absorber bass 4, and the bulkhead 5 will be described below in detail.

[Rear Wheel House Inner]

The rear wheel house inner 2a shown in FIG. 2 is a metal member formed in the shape of a hat, as seen in the horizontal sectional view, that has openings on the outboard and lower sides thereof. The rear wheel house inner 2a has a lower wheel house 21 that houses a rear tire (not illustrated) therein, an upper shock absorber housing 22 that houses a shock absorber D (see FIG. 4) therein, and a joining flange 23 that is a mounting surface on which the rear wheel house outer 2b is mounted.

The shock absorber housing 22 has an upper wall 24, a front wall 25 that vertically extends from a front end of the upper wall 24, a rear wall 26 that vertically extends from a rear end of the upper wall 24, and an inboard wall 27 that vertically extends from an inboard end of the upper wall 24. The upper wall 24 forms an upper surface of the bag structure 1. The front wall 25 forms a front surface of the bag structure 1. The rear wall 26 forms a rear surface of the bag structure 1. The inboard wall 27 forms an inboard surface of the bag structure 1.

The front wall 25, the rear wall 26, and the inboard wall 27 extend from an upper end to a lower end of the rear wheel house inner 2a and play a role as a wall portion of the wheel house 21 as well. The longitudinal length of the inboard wall 27 increases toward the lower end of the inboard wall 27.

[Shock Absorber Base]

The shock absorber base 4 is a metal member that is disposed inside the shock absorber housing 22 and to which the shock absorber D is secured. The shock absorber base 4 is formed in an "L" shape as seen in the vertical sectional view. The shock absorber base 4 has a horizontal wall 41 that opposes the upper wall 24 and a vertical wall 42 that vertically extends from an outboard end of the horizontal wall 41.

The horizontal wall 41 forms a lower surface of the bag structure 1. The horizontal wall 41 is located below and away from the upper wall 24 so as to lie between the front wall 25 and the rear wall 26. The horizontal wall 41 has an inboard flange 45 extending downward from an inboard end thereof and is secured to the inboard wall 27 via the inboard flange 45. The horizontal wall 41 partitions an internal, space of the shock absorber housing 22 into upper and lower compartments. The horizontal wall 41 consists of s substantially horizontal shook absorber mounting surface 47 to which the shock absorber D is secured and a slanted surface 48 extending from a front end of the shook absorber mounting surface 47.

Figure 3:
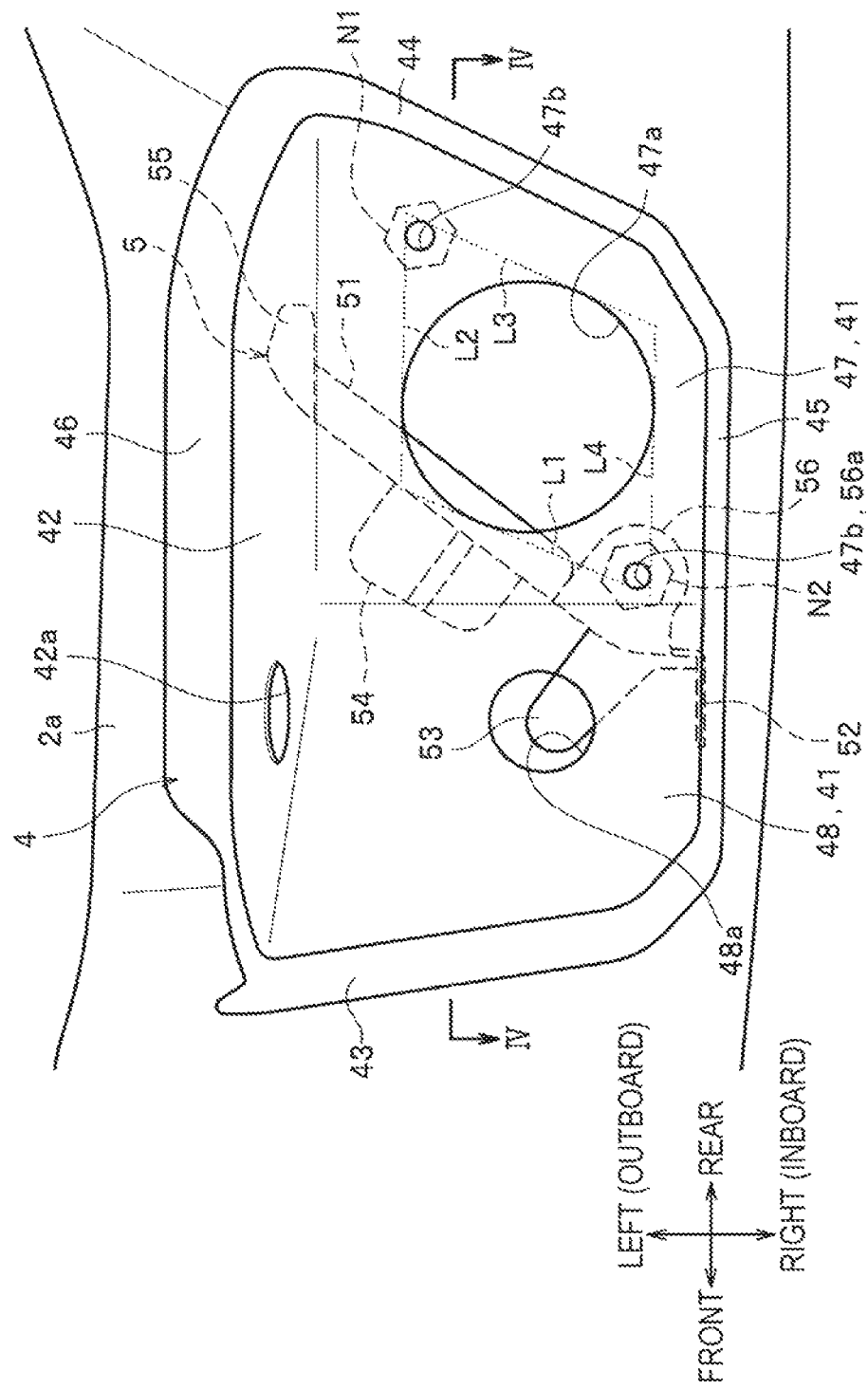
FIG. 3 is a bottom view, as seen from below, of a shock absorber base and a bulkhead of FIG. 2.

The shock absorber mounting surface 47 shown in FIG. 3 has a mounting hole 47*a* through which a head of the shock absorber D is inserted and two first shock absorber fastening portions 47*b*, 47*b* to which the shock absorber D is fastened. The first shock absorber fastening portions 47*b*, 47*b* are formed around the mounting hole 47*a* so as to oppose each other. One of the first shock absorber fastening portions 47*b*, 47*b* is disposed in front of and on the inboard side of the mounting hole 47*a*, while the other is disposed in the rear of and on the outboard side of the mounting hole 47*a*. The mounting hole 47*a* and the first shock absorber fastening portions 47*b*, 47*b* are disposed in such a manner that virtual tangent lines L1 through L4 thereof form a rhombus or a diamond shape.

Each of the mounting hole 47*a* and the first shock absorber fastening portions 47*b*, 47*b* consists of a circular through-hole. Each of the first shock absorber fastening portions 47*b*, 47*b* is smaller in diameter than the mounting hole 47*a*. A second shock absorber fastening portion 56*a* is a hole through which a bolt (not illustrated) provided on an upper end of the shock absorber D is inserted. A nut N1 is joined to an upper surface of the shock absorber mounting surface 47 so as to be coaxial with one of the first shock absorber fastening portions 47*b*, 47*b*. To secure the shock absorber D to the shock absorber mounting surface 47, the bolt provided on an upper end of the shock absorber D is screwed into the nut N1 through one of the first shock absorber fastening portions 47*b*, 47*b*. The number and location of the first shock absorber fastening portions 47*b*, 47*b* may be changed, if needed.

The slanted surface 48 is slanted in such a manner that a portion thereof closer to the front is located higher than the shock absorber mounting surface 47 (or is slanted in such a manner that a portion thereof farther away from the shock absorber mounting surface 47 is located closer to the top). The slanted surface 48 has a through-hole 48*a* formed at a position thereof corresponding to the bulkhead 5, the through-hole 48*a* allowing access for welding operation.

Figure 4:
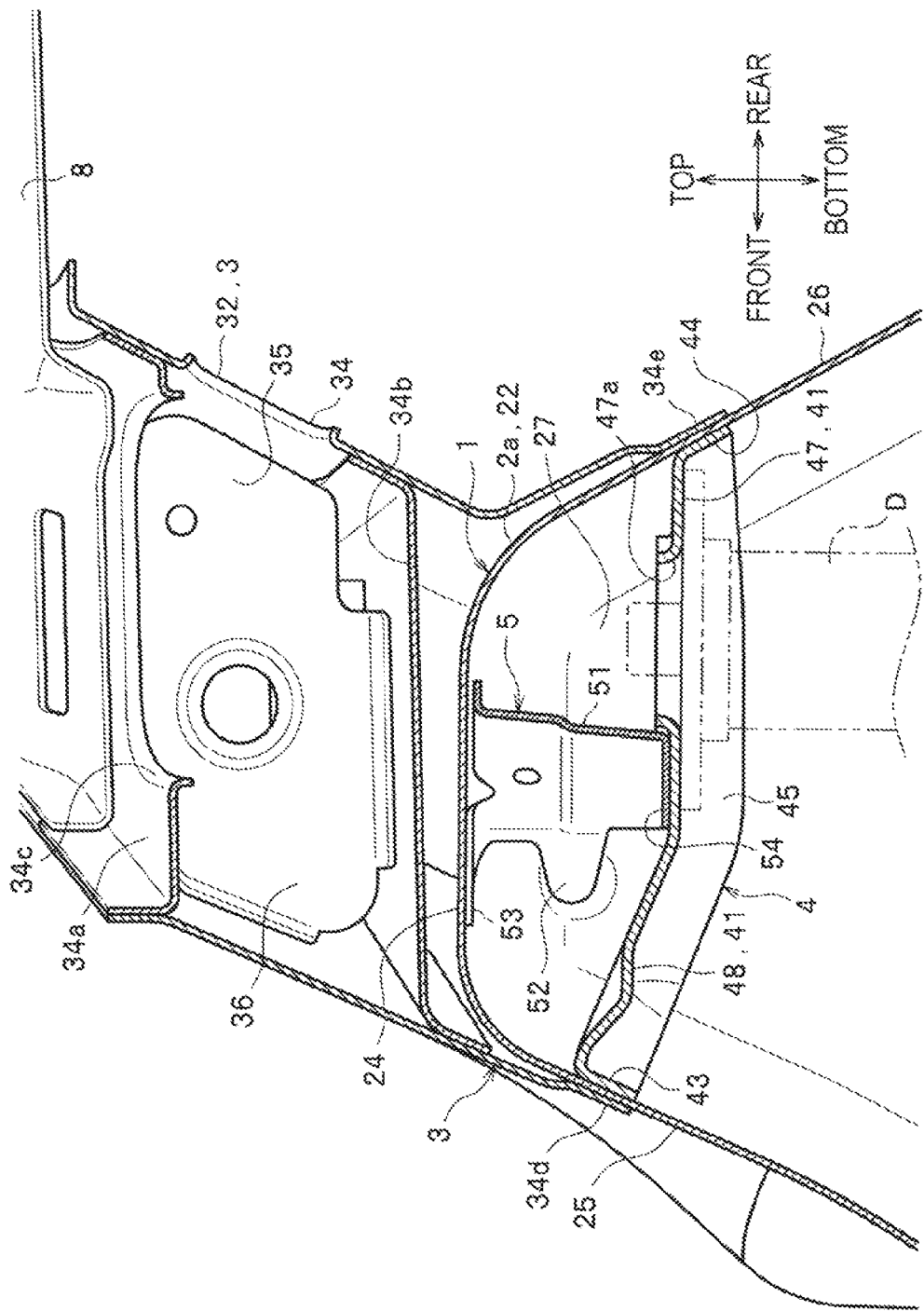
FIG. 4 is a cross-sectional view taken along line IV-IV of FIG. 3.

As shown in FIG. 4, the horizontal wall 41 (the slanted surface 48) has a front flange 43 extending downward from a front end thereof. In this embodiment, the front flange 43, the front wall 25 of the shock absorber housing 22, and the rear bulkhead 3 are overlaid and joined to one another by welding.

The horizontal wall 41 (shock absorber mounting surface 47) has a rear flange 44 extending downward from a rear end thereof. In this embodiment, the rear flange 44, the rear wall 26 of the shock absorber housing 22, and the rear bulkhead 3 are overlaid and joined to one another by welding. At least one of the front flange 43 and the rear flange 44 may be joined to the rear bulkhead 3 via the shock absorber housing 22.

The vertical wall 42 shown in FIG. 2 forms an outboard surface of the bag structure 1. The vertical wall 42 is located on the outboard side of and away from the inboard wall 27 so as to lie between the front wall 25 and the rear wall 26. The vertical wall 42 has an outboard flange 46 extending outboard from an upper end thereof and is secured to the upper wall 24 via the outboard flange 46. The upper wall 24 partitions an internal space of the shock absorber housing 22 into right and left compartments. In this embodiment, six planes, including the upper wall 24, the front wall 25, the rear wall 26, the inboard wall 27, the horizontal wall 41, and the vertical wall 42, form the bag structure 1 in the upper part of the shock absorber housing 22. The vertical wall 42 has an access hole 42*a* for welding operation formed at a position corresponding to the bulkhead 5.

[Bulkhead]

The bulkhead 5 is a metal member that reinforces the bag structure 1. The bulkhead 5 is formed by folding one sheet of metal into a predetermined shape. The bulkhead 5 shown in FIG. 5 has a partition 51, a first mounting piece 52, a second mounting piece 53, a third mounting piece 54, a fourth mounting piece 55, and a fifth mounting piece 56. In FIG. 5, portions indicated by a symbol "X" show joining areas where spot welding is conducted.

As shown in FIG. 3, the partition 51 partitions an internal space of the bag structure 1 into front and rear compartments. In this embodiment, the partition 51 is slanted in such a manner that a portion thereof closer to the outboard side of the vehicle is located closer to the rear of the vehicle. The partition 51 is located in the vicinity of the first shock absorber fastening portions 47*b*, 47*b*. The partition 51 is disposed in such a manner as to be substantially aligned with one virtual line L1 that is tangential to the mounting hole 47*a* and one of the first shock absorber fastening portions 47*b*, 47*b*. The partition 51 may be disposed in such a manner as to oppose the first shock absorber fastening portions 47*b*, 47*b* or to be completely aligned with the virtual line L1.

As shown in FIG. 5, the first mounting piece 52 extends forward from an inboard end of the partition 51 and is welded to the inboard wall 27 of the rear wheel house inner 2*a* (see FIG. 4).

The second mounting piece 53 extends forward and outboard from an upper inboard end of the partition 51 and is welded to the upper wall 24 of the rear wheel house inner 2*a* (see FIG. 4).

The third mounting piece extends forward and outboard from near the middle of a lower end of the partition 51 and is welded to the horizontal wall 41 of the shock absorber base 4 (see FIG. 4).

The fourth mounting piece 55 extends rearward from an outboard end of the partition 51 and is welded to the vertical wall 42 of the shock absorber base 4 (see FIG. 3).

The fifth mounting piece 56 extends rearward and inboard from a lower inboard end of the partition 51. The fifth mounting piece 56 has the second shock absorber fastening portion 56*a* that is in communication with one of the first shock absorber fastening portions 47*b*, 47*b* (see FIG. 3). The second shock absorber fastening portion 56*a* consists of a circular through-hole. The bolt (not illustrated) provided on the upper end of the shock absorber D is inserted through the second shock absorber fastening portion 56*a*.

A nut N2 is joined to an upper surface of the fifth mounting piece 56 so as to be coaxial with the second shock absorber fastening portion 56*a*. To secure the shock absorber D to the fifth mounting piece 56, the bolt (not illustrated) provided on the upper end of the shook absorber D is screwed info the nut N2 through one of the first shock absorber fastening portions 47*b*, 47*b* and the second shock absorber fastening portion 56*a*. The number and location of the second shock absorber fastening portion 56*a* may be changed, if needed. For example, the location of the first shock absorber fastening portion 47*b* and the second shock absorber fastening portion 56*a* may be shifted.

Next, the upper horizontal member 32 of the rear bulkhead 3 is described below in detail with reference to FIGS. 6 and 7.

The upper horizontal member 32 has a horizontal member central portion 33 provided below the parcel shelf 8 so as to be located between the right and left vertical members 31 and a horizontal member extension 34 (see FIG. 7) provided on an outboard end of the horizontal member central portion 33 so as to be located on the outboard side of the vertical member 31.

The horizontal member central portion 33 is formed substantially in the shape of a hat having an upward opening, as seen in the vertical sectional view in the longitudinal direction. A flange fenced at an opening edge of the horizontal member central portion 33 is welded to a front portion of the parcel shelf 8 whereby a closed section extending in the vehicle-width direction is formed between the horizontal member central portion 33 and the parcel shelf 8.

The horizontal member extension 34 has a hollow section. The horizontal member extension 34 shown in FIG. 7 extends to above the bag structure 1. The horizontal member extension 34 has an opening 34c formed in an upper wall 34a thereof through which inside and outside portions of the horizontal member extension 34 are in communication with each other. In addition, the horizontal member extension 34 has an outboard flange 46 of the shock absorber base 4 welded to a lower wall 34b thereof via the upper wall 24 of the shock absorber housing 22.

In the horizontal member extension 34, a horizontal member bulkhead 35 for partitioning an internal space of the horizontal member 32 into right and left compartments is provided close to a border with the horizontal member central portion 33. The horizontal member bulkhead 35 is formed in the shape of a crank, as seen in the vertical sectional view in the vehicle-width direction. The upper flange of the horizontal member bulkhead 35, the upper wall 34a, and the parcel shelf 8 are overlaid and are joined to one another by welding. The lower flange of the horizontal member bulkhead 35 is welded to the lower wall 34b. The horizontal member bulkhead 35 is disposed above the bag structure 1.

In the horizontal member extension 34, a space located on the outboard side of the horizontal member bulkhead 35 functions as a housing 36 for housing a seat belt take-up device 37 therein. The housing 36 is provided above the bag structure 1. The presence of the housing 36 enables the seat belt take-up device 37 to be housed inside the rear bulkhead 3, whereby a space for disposing the rear quarter glass 11 (FIG. 1) can be created on the outboard side of the rear bulkhead 3. The seat belt take-up device 37 is provided below the opening 34c. Maintenance work for the seat belt take-up device 37 can be done through the opening 34c.

As shown in FIG. 4, lower ends of a front wall 34d and a rear wall 34e of the horizontal member extension 34 extend downward beyond the lower wall 34b and reach the shock absorber housing 22 of the rear wheel house inner 2a. The front wall 34d is located in front of the front wall 25 of the shock absorber housing 22 and the front flange 43 of the shock absorber base 4. The rear wall 34e is located behind the rear wall 26 of the shock absorber housing 22 and the front flange 43 of the shock absorber base 4.

Next, the vertical member 31 of the rear bulkhead 3 and the reinforcing brace 9 are described below in detail with reference to FIGS. 6 and 7.

Figure 6:
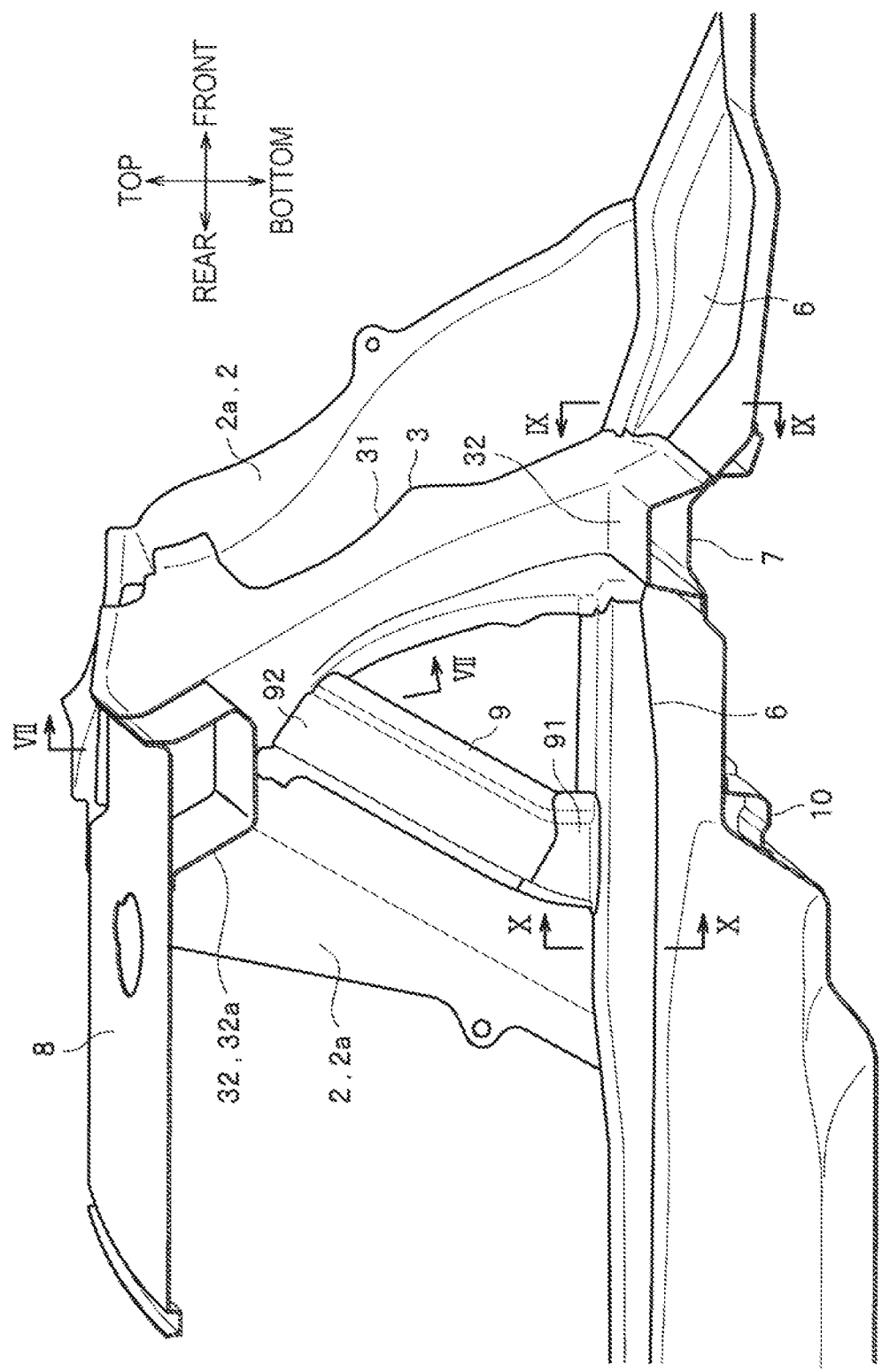
FIG. 6 is a cross-sectional view taken along line VI-VI of FIG. 1.

The vertical member 31 of the rear bulkhead 3 shown in FIG. 6 is mounted obliquely on the inboard side of the rear wheel house inner 2a between the upper and lower horizontal members 32, 32. In other words, the lower horizontal member 32 is located in front of the upper horizontal member 32, while the vertical member 31 extends obliquely upward from the lower horizontal member 32 toward the upper horizontal member 31. The vertical member 31 is joined to the rear wheel house inner 2a, forming a closed section therebetween.

The reinforcing brace 9 is mounted obliquely on the inboard side of the rear wheel house inner 2a between the rear side frame 6 and the vertical member 31. In other words, the reinforcing brace 9 extends obliquely upward from the rear side frame 6 toward the vicinity of an upper end of the vertical member 31. The reinforcing member 9 and the vertical member 31 are arranged so as to form the shape of an inverted V as seen in side view. The reinforcing brace 9 supports the vertical member 31 from the rear.

A lower end 91 of the reinforcing brace 9 is secured to the rear side frame 6. An upper end 92 of the reinforcing brace 9 shown in FIG. 7 is secured to the inboard wall 27 of the rear wheel house inner 2a and the vicinity of the upper end of the vertical member 31 in the vicinity of the inboard flange 45 of the shock absorber base 4. An outboard side of the reinforcing brace 9 is secured to the inboard wall 27 of the rear wheel inner 2a.

Figure 8:
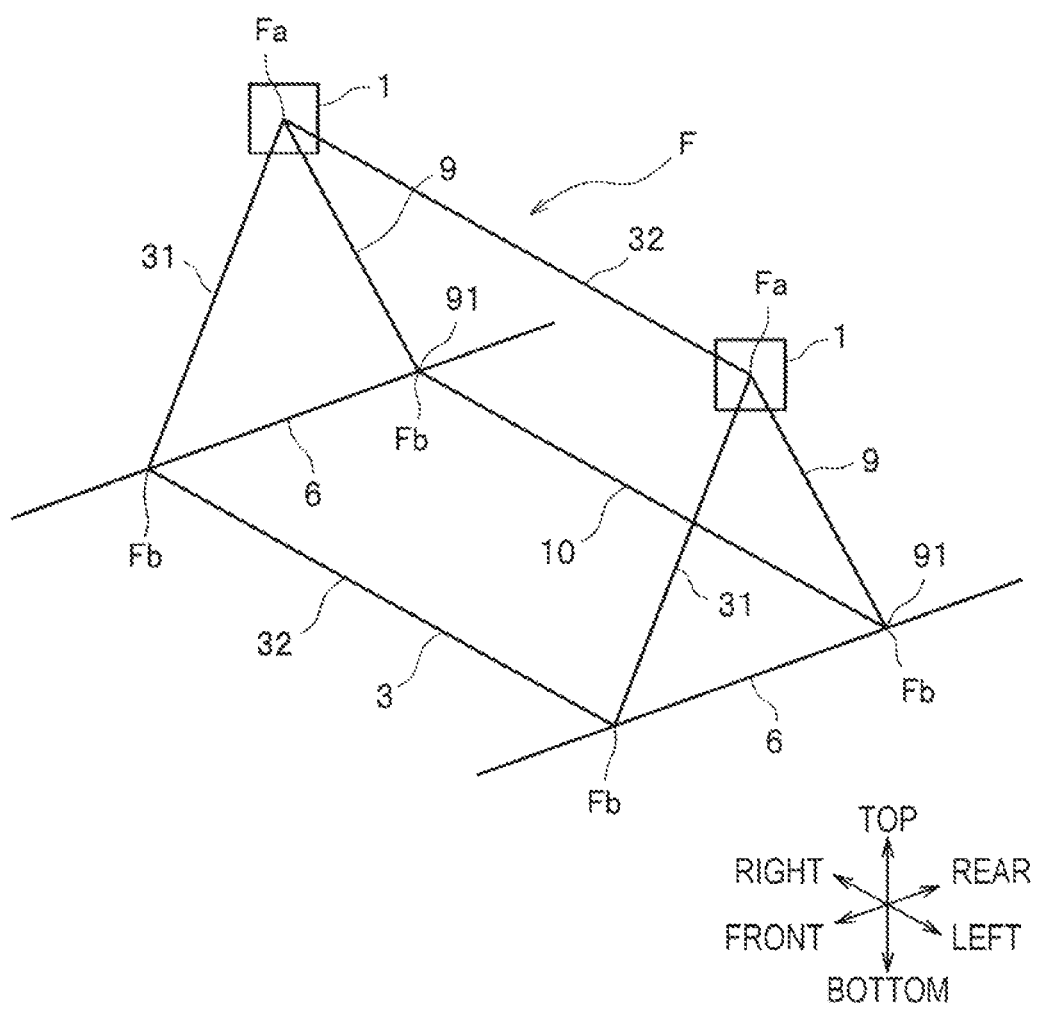
FIG. 8 is a schematic view of a skeleton structure and a bag structure according to an embodiment.

Next, the skeleton structure F and the bag structure 1 provided in the rear of the vehicle V are described below in detail with reference to FIGS. 8 through 10. FIG. 8 schematically shows the skeleton structure F by one solid line and the bag structure 1 by a square box for convenience of description.

The skeleton structure F in the rear of the vehicle V consists of the right and left rear side frames 6, 6, the rear bulkhead 3, the right and left reinforcing braces 9, 9, and the rear cross member 10.

The rear side frames 6, 6 are spaced apart from each other in the vehicle-width direction and extend in the longitudinal direction. The rear bulkhead 3 formed in a rectangular annular shape is provided between the right and left rear side frames 6, 6 and is mounted obliquely in such a manner that a portion thereof closer to the top of the vehicle is located closer to the rear.

The reinforcing braces 9, 9 are provided between the rear side frames 6, 6 and the rear bulkhead 3 and are mounted obliquely in such a manner that portions thereof located higher than the rear side frames 6, 6 are located closer to the front of the vehicle.

The rear cross member 10 extends in the vehicle-width direction between the right and left rear side frames 6, 6. The right and left ends of the rear cross member 10 are joined to the right and left rear side frames 6, 6 at right and left positions which correspond to right and left lower ends 91, 91 of the right and left reinforcing braces 9, 9, respectively.

The right and left rear side frames 6, 6, the rear bulkhead 3, the right and left reinforcing braces 9, 9, and the rear cross member 10 are assembled so as to form the triangular prismatic skeleton structure F extending in the vehicle-width direction. In other words, the skeleton structure F is assembled so as to form a ridge line of the triangular prism. The skeleton structure F is disposed in such a manner that one apex of the triangle is located on an upper side and the other two apexes are located on a lower side, when seen in side view.

The bag structures 1, 1, are provided at right and left upper apexes Fa, Fa of the skeleton structure F, respectively. In other words, the bag structures 1, 1 are provided in the vicinity of joining portions where the rear bulkhead 3 and the reinforcing braces 9, 9 are joined to each other.

The skeleton structure F is joined at four lower apexes Fb, Fb . . . thereof to a rear sub-frame 12 (see FIGS. 9 and 10) whereby the skeleton structure F receives a load coming from a rear tire via the rear sub-frame 12.

Figure 9:
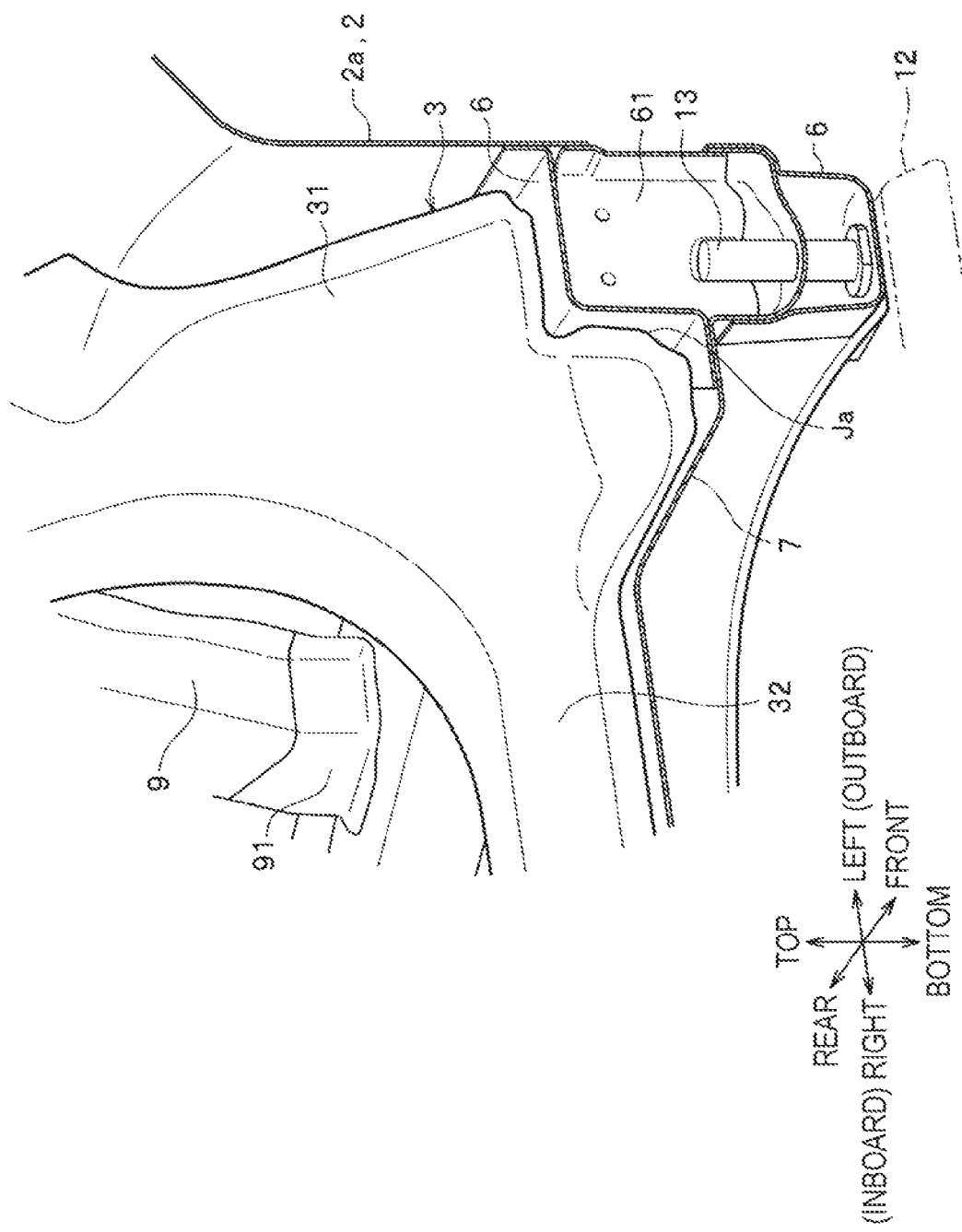
FIG. 9 is a cross-sectional perspective view taken along IX-IX of FIG. 6.

As shown in FIG. 9, part of the rear sub-frame 12 is joined to the rear side frame 6 in the vicinity of a portion Ja joined to the rear bulkhead 3 are joined to each other. The rear side frame 6 has a front frame bulkhead 61 disposed therein at a position corresponding to the portion Ja joined to the rear bulkhead 3. The front frame bulkhead 61 has a collar nut 13 for mounting the rear sub-frame 12 attached to a front face thereof.

Figure 10:
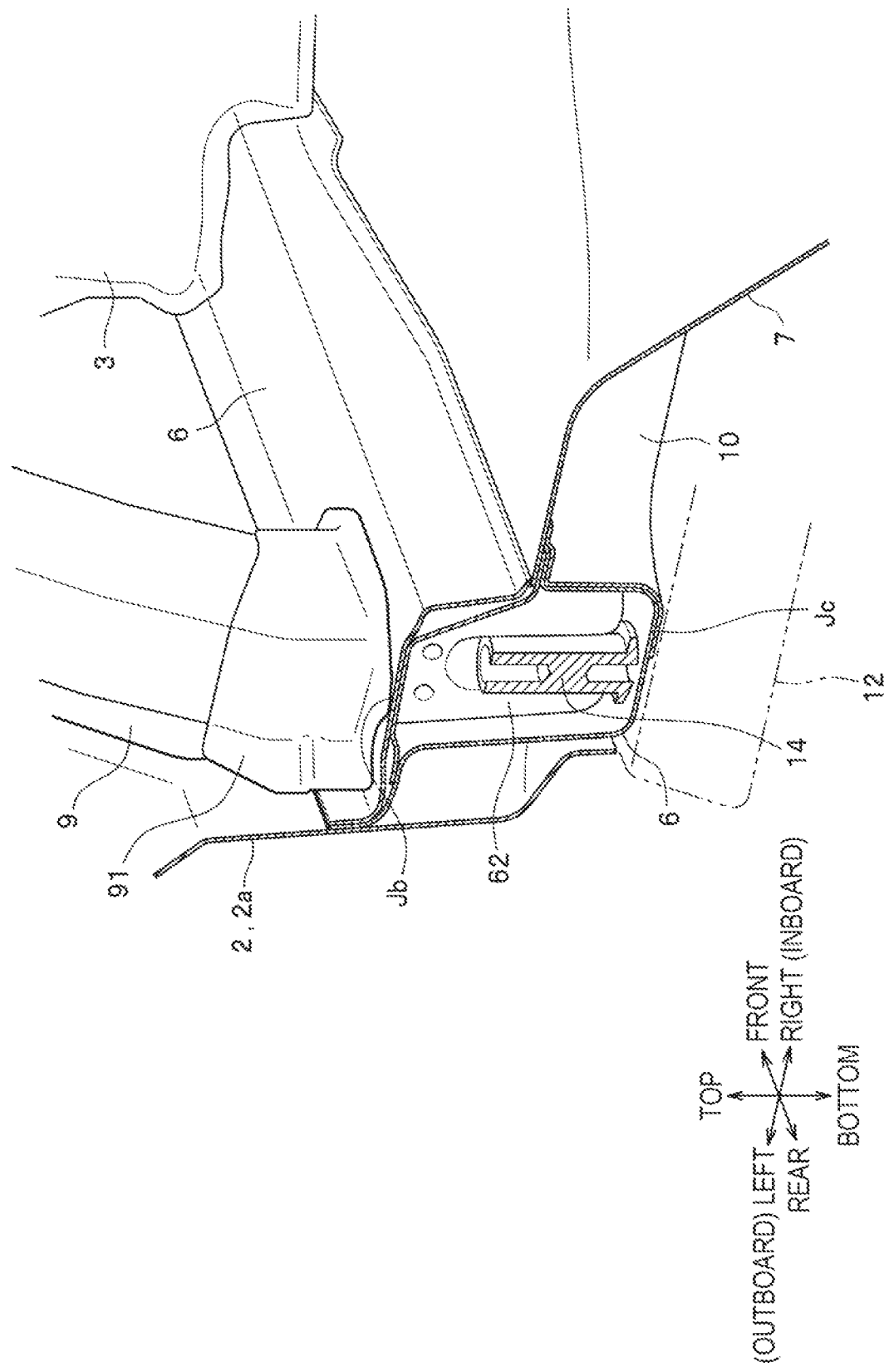
FIG. 10 is a cross-sectional perspective view taken along X-X of FIG. 6.

In addition, as shown in FIG. 10, part of the rear sub-frame 12 is joined to the rear side frame 6 in the vicinity of a portion Jb joined to the reinforcing brace S and a potion Jc joined to the rear cross member 10. The rear side frame 6 has at rear frame bulkhead 62 disposed therein at a position corresponding to the portion Jb joined to the reinforcing brace 9 and the portion Jc joined to the rear cross member 10. The rear frame bulkhead 62 has a collar nut 14 for mounting the rear sub-frame 12 attached to a rear face thereof.

The vehicle V that uses the vehicle rear structure according to the embodiment of the present application basically has the configuration described above. Next, the advantages offered by the vehicle rear structure are described below.

In the vehicle rear structure according to the embodiment, the bag structure 1 having a closed space therein is a rigid body whereby the shock absorber mounting surface 47 to which the shock absorber D is secured can be improved in rigidity. In addition, the bag structure 1 having a rigid body and the rear bulkhead 3 are joined to each other whereby a load coming from the shock absorber D can be reliably transmitted to the rear bulkhead 3. With this arrangement, a deformation of the shock absorber mounting surface 47 can be reduced or eliminated whereby plate thickness of the shock absorber mounting surface 47 can be reduced for reduction in weight and the characteristics of the shock absorber can be exhibited to the full extent for improvement in maneuvering stability.

In addition, the bulkhead 5 is disposed inside the bag structure 1. The bulkhead 5 improves the bag structure 1 in rigidity.

In addition, the bulkhead 5 is disposed in the vicinity of the first shook absorber fastening portions 47b, 47b whereby the first shock absorber fastening portions 47b, 47b can be improved in rigidity, which reduces or eliminates deformation of the shock absorber mounting surface 47.

In addition, the second shock absorber fastening portion 56a is formed in the bulkhead 5 whereby deformation of the shock absorber mounting surface 47 can be further reduced or eliminated due to enhanced rigidity of the second shock absorber fastening portion 56a.

In addition, the bulkhead 5 is disposed in such a manner as to be substantially aligned with a virtual line L1 that is tangential to the mounting hole 47a of the shock absorber base 4 and one of the first shock absorber fastening portions 47b, 47b, whereby deformation of the shock absorber mounting surface 47 can be further reduced or eliminated due to enhanced rigidity of the mounting hole 47a and the first shock absorber fastening portion 47b.

In addition, the front flange 43 and the rear flange 44 of the shock absorber base 4 are joined to the rear bulkhead 3 via the shock absorber housing 22, whereby a load can be reliably transmitted from the front flange 43 and the rear flange 44 to the rear bulkhead 3 via the shock absorber housing 22.

In addition, the shock absorber base 4 has the slanted surface 48 that continuously extends to the shook absorber mounting surface 47, whereby an out-of-plane deformation (or vertical deformation) can be reduced or eliminated due to the presence of the slanted surface 48 and the bag structure 1 can be improved in rigidity.

In addition, the outboard flange 46 of the shock absorber base 4 is secured to the lower wall 34b of the horizontal member extension 34 via the shock absorber housing 22, whereby a load can be reliably transmitted from the outboard flange 46 to the horizontal member 32 of the rear bulkhead 3 via the shock absorber housing 22.

In addition, the horizontal member 32 has horizontal member bulkhead 35 formed therein and the horizontal member bulkhead 35 is disposed above the bag structure 1, whereby a load can be reliably transmitted from the bag structure 1 to the horizontal member 32 of the rear bulkhead 3 via the shock absorber housing 22.

In addition, the reinforcing member 9 and the vertical member 31 are arranged on the inboard side of the rear wheel house 2 so as to form the shape of an inverted V as seen in side view, and the upper end 92 of the reinforcing brace 9 is secured to the rear wheel house inner 2a and the vertical member 31 in the vicinity or the inboard flange 45 of the shock absorber base 4, whereby a load can be reliably transmitted from the inboard flange 45 to the vertical member 31 of the rear bulkhead 3 via the rear wheel house 2 and the reinforcing brace 9.

In addition, the right and left rear side frames 6, 6, the rear bulkhead 3, the right and left reinforcing braces 9, 9, and the rear cross member 10 are assembled together to form the triangular prismatic skeleton structure F, and the bag structure 1 is provided at each of the right and left upper apexes Fa, Fa of the skeleton structure F. With this arrangement, due to the bag structure 1 reinforcing the triangular prismatic skeleton structure F, the rear section of the vehicle can be significantly improved. In rigidity and a load coming from the rear sub-frame 12 disposed below the rear side frame 6 can be supported by the triangular prismatic skeleton structure F, thereby improving maneuvering stability. In addition, a load coming from the shock absorber D can also be supported by the triangular prismatic skeleton structure F in a preferred manner.

Furthermore, the seat belt take-up device 37 is housed in the housing 36 provided in the horizontal member extension 34, thereby creating a space for disposing the rear quarter glass 11, which improves rearward visibility.

The present application is typically described with reference to, but not limited to, the foregoing embodiment by referring to the attached drawings. Various modifications are conceivable within the scope of the present disclosure.

In this embodiment, the partition 51 is disposed in such a manner as to be substantially aligned with one virtual line L1 that is tangential to the mounting hole 47a and one of the first shock absorber fastening portions 47b, 47b, but the partition 51 may be shifted so as not to be aligned with one virtual line L1, as shown in, for example, FIG. 11. A partition 51' of a bulkhead 5' shown in FIG. 11 extends in the vehicle-width direction in such a manner as to be longitudinally shifted from one virtual line L1 that is tangential to the mounting hole 47a and one of the first shock absorber fastening portions 47b, 47b. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle rear structure comprising:
   rear wheel houses that are provided on right and left sides of a vehicle, respectively, each of the rear wheel houses including a shock absorber housing for housing a shock absorber; and
   a partitioning member that is provided between the right and left rear wheel houses and separates a passenger compartment and a luggage compartment,
   wherein the shock absorber housing includes a bag structure at upper portion thereof, the bag structure defining a closed space therein,
   wherein the bag structure is secured to the partitioning member and the shock absorber is secured to the bag structure,
   wherein the bag structure includes an upper wall, a bottom wall and a plurality of side walls, the upper wall, bottom wall and the plurality of side walls define the closed space therein, and
   a top portion of the shock absorber is secured to the bottom wall of the bag structure such that the shock absorber is positioned under the closed space.

2. The vehicle rear structure according to claim 1, further comprising
   a bulkhead disposed in the bag structure.

3. The vehicle rear structure according to claim 2,
   wherein the bag structure includes a first shock absorber fastening portion for securing the shock absorber, and
   wherein the bulkhead is disposed at a position corresponding to the first shock absorber fastening portion or in the vicinity of the first shock absorber fastening portion.

4. The vehicle rear structure according to claim 3,
   wherein the bulkhead includes a second shock absorber fastening portion for securing the shock absorber.

5. The vehicle rear structure according to claim 3,
   wherein the bag structure includes a mounting hole through which a head of the shock absorber is inserted;
   wherein the first shock absorber fastening portion is formed around the mounting hole, and
   wherein the bulkhead is disposed so as to be aligned with a virtual line that is tangential to the mounting hole and the first shock absorber fastening portion.

6. The vehicle rear structure according to claim 1, further comprising:
   a shock absorber base disposed in each of the shock absorber housings such that the shock absorber is secured to the shock absorber base,
   wherein the bag structure comprises the shock absorber base and the shock absorber housing,
   wherein the shock absorber base includes a front flange formed at a front end thereof and includes a rear flange formed at a rear end thereof, and
   wherein the front flange, or the rear flange, or both of the front flange and the rear flange are secured to the partitioning member via the shock absorber housing.

7. The vehicle rear structure according to claim 6,
   wherein the shock absorber base includes a shock absorber mounting surface to which the shock absorber is secured and a slanted surface extending continuously from the shock absorber mounting surface, the slanted surface being slanted upward from the shock absorber mounting surface.

8. The vehicle rear structure according to claim 6,
   wherein the partitioning member includes a horizontal member extending in a vehicle-width direction,
   wherein an outboard end of the horizontal member extends to a position located above the bag structure,
   wherein the shock absorber base includes an outboard flange provided to an upper end thereof, and
   wherein the outboard flange is secured to the outboard end of the horizontal member via the shock absorber housing.

9. The vehicle rear structure according to claim 8,
   wherein the horizontal member includes a horizontal member bulkhead disposed therein, and
   wherein the horizontal member bulkhead is disposed above the bag structure.

10. The vehicle rear structure according to claim 6, further comprising:
    reinforcing braces provided on inboard sides of the rear wheel houses, respectively,
    wherein the partitioning member includes vertical members provided on the inboard sides of the rear wheel houses, respectively,
    wherein each of the reinforcing braces and corresponding one of the vertical members are disposed so as to make an inverted V shape in side view,
    wherein the shock absorber base includes an inboard flange provided to an inboard end thereof, the inboard flange being secured to the rear wheel houses, and
    wherein the reinforcing braces are secured to the rear wheel houses and the vertical members, respectively in the vicinity of the inboard flange.

11. The vehicle rear structure according to claim 1, comprising:
    rear side frames that are provided on the right and left sides of the vehicle, respectively, each extending in a longitudinal direction of the vehicle, wherein the partitioning member includes an annular skeleton provided between the right and left rear side frames such that the skeleton is inclined rearward from a lower portion thereof toward an upper end thereof;
    reinforcing braces that are provided between the rear side frames and the partitioning member, respectively, each of the reinforcing braces being inclined forward from a lower portion thereof toward an upper end thereof;
    a rear cross member that extends in a vehicle-width direction between the right and left rear side frames and that is joined to the respective rear side frames at right and left ends thereof at positions corresponding to lower ends of the reinforcing braces, respectively,
    wherein the right and left rear side frames, the partitioning member, the right and left reinforcing braces, and the rear cross member are assembled so as to form a triangular-prism-skeleton structure; and
    wherein the bag structure is provided at right and left upper apexes of the triangular-prism-skeleton structure, respectively.

12. The vehicle rear structure according to claim 1,
    wherein, in the partitioning member, a housing for housing a seat belt take-up device is provided at a position above the bag structure.

13. The vehicle rear structure according to claim 1,
    wherein the bag structure constitutes a rigid body.

14. The vehicle rear structure according to claim 13,
    wherein the rigid body is joined to the partitioning member.

15. The vehicle rear structure according to claim 6,
wherein the shock absorber base has an L shape in cross-section to have a horizontal wall and a vertical wall,
the shock absorber housing includes an upper wall and side walls,
an end of the vertical wall of the shock absorber base is connected to the upper wall such that the closed space is defined by the shock absorber base and the upper wall and the side walls of the shock absorber housing.

16. The vehicle rear structure according to claim 6,
wherein the front flange or the rear flange, a sidewall of the shock absorber housing and the partitioning member are overlapped with and joined to each other.

17. The vehicle rear structure according to claim 4,
wherein the second shock absorber fastening portion is in communication with the first shock absorber fastening portion.

18. The vehicle rear structure according to claim 1,
wherein the bag structure is a polyhedron comprising five or more planes.

19. A vehicle comprising the vehicle rear structure according to claim 1.

\* \* \* \* \*